US008700956B2

(12) United States Patent
Asada et al.

(10) Patent No.: US 8,700,956 B2
(45) Date of Patent: Apr. 15, 2014

(54) MICROCOMPUTER

(75) Inventors: Yuuki Asada, Obu (JP); Naoki Ito, Nagoya (JP); Kyouichi Suzuki, Toyohashi (JP); Norio Fujimori, Nagoya (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 13/305,133

(22) Filed: Nov. 28, 2011

(65) Prior Publication Data

US 2012/0137176 A1 May 31, 2012

(30) Foreign Application Priority Data

Nov. 29, 2010 (JP) ................................. 2010-265014
Oct. 13, 2011 (JP) ................................. 2011-225842

(51) Int. Cl.
*G06F 11/00* (2006.01)

(52) U.S. Cl.
USPC ............................................. 714/30; 714/34

(58) Field of Classification Search
USPC ....................... 714/30, 47.1, 34, 37
See application file for complete search history.

(56) References Cited

U.S. PATENT DOCUMENTS

| | | | | |
|---|---|---|---|---|
| 4,511,961 A | * | 4/1985 | Penton | 711/201 |
| 4,845,615 A | * | 7/1989 | Blasciak | 714/10 |
| 5,103,394 A | * | 4/1992 | Blasciak | 714/47.1 |
| 5,740,451 A | | 4/1998 | Muraki et al. | |
| 5,978,902 A | | 11/1999 | Mann | |
| 6,009,270 A | | 12/1999 | Mann | |
| 6,041,406 A | | 3/2000 | Mann | |
| 6,094,729 A | | 7/2000 | Mann | |
| 6,142,683 A | | 11/2000 | Mann | |
| 6,148,381 A | | 11/2000 | Jotwani | |
| 6,154,856 A | * | 11/2000 | Madduri et al. | 714/27 |
| 6,154,857 A | * | 11/2000 | Mann | 714/30 |
| 6,167,536 A | | 12/2000 | Mann | |
| 6,185,732 B1 | | 2/2001 | Mann et al. | |
| 6,189,140 B1 | | 2/2001 | Madduri | |
| 6,314,530 B1 | | 11/2001 | Mann | |

(Continued)

FOREIGN PATENT DOCUMENTS

CN 1940885 A 4/2007
JP A-S62-239247 10/1987

(Continued)

OTHER PUBLICATIONS

Search Report mailed on Mar. 8, 2012 in corresponding GB Application No. 1120523.4.

(Continued)

*Primary Examiner* — Yolanda L Wilson
(74) *Attorney, Agent, or Firm* — Posz Law Group, PLC

(57) ABSTRACT

A debug circuit of a microcomputer, providing an on-chip debug function, is provided as a measurement permission circuit for outputting a measurement permission signal to a timer that measures, as a measurement object, a time period between two events in a program execution period of the CPU, according to a user-specified condition. The measurement permission circuit includes an interrupt level register for setting an interrupt level that either permits or prohibits a time measurement operation of the timer, and a comparator for determining by comparison a high-low relationship between an interrupt level of an interrupt process executed by the CPU and an interrupt level set in the interrupt level register, and a determination result of the comparator is specified as the measurement permission signal.

16 Claims, 11 Drawing Sheets

(56) References Cited

U.S. PATENT DOCUMENTS

| | | | | |
|---|---|---|---|---|
| 7,895,382 B2* | 2/2011 | DeWitt et al. | ............... | 710/260 |
| 2002/0186395 A1 | 12/2002 | Katsu | | |
| 2010/0064174 A1* | 3/2010 | Oosaki | ............... | 714/34 |

FOREIGN PATENT DOCUMENTS

| | | |
|---|---|---|
| JP | A-3-018939 | 1/1991 |
| JP | A-H03-046040 | 2/1991 |
| JP | A-3-118644 | 5/1991 |
| JP | A-04-051332 | 2/1992 |
| JP | A-04-349543 | 12/1992 |
| JP | A-H05-298138 | 11/1993 |
| JP | A-2000-148536 | 5/2000 |
| JP | A-2000-267709 | 9/2000 |
| JP | A-2001-297012 | 10/2001 |
| JP | A-2005-100017 | 4/2005 |
| JP | A-2006-293427 | 10/2006 |
| JP | A-2008-310748 | 12/2008 |

OTHER PUBLICATIONS

Office Action mailed Dec. 25, 2012 in corresponding JP patent application No. 2011-225842 (and English translation).

Office Action mailed Mar. 12, 2013 in corresponding JP patent application No. 2011-225842 (and English translation).

Office action dated Jan. 6, 2014 in the corresponding CN application No. 2011 1038 6242.5 (English translation).

\* cited by examiner

MICROCOMPUTER

CROSS REFERENCE TO RELATED APPLICATION

The present application is based on and claims the benefit of priority of Japanese Patent Application No. 2010-265014, filed on Nov. 29, 2010 and Japanese Patent Application No 2011-225842, filed on Oct. 13, 2011, the disclosure of which is incorporated herein by reference.

TECHNICAL FIELD

This disclosure generally relates to a microcomputer having an on-chip debug function.

BACKGROUND

Conventionally, a microcomputer uses a program that uses a technique to measure a process time of a specific process in the program. Such a technique is described in Japanese Patent Laid-Open No. H3-118644 (JP '644), where the process is configured to set a start address for starting process time measurement and an end address for ending process time measurement, in order to calculate the process time as a time measurement between those two addresses. However, the microcomputer may execute subroutines such as a mathematical function and various interrupt programs during the execution of a main routine, and the subroutines may further be interrupted by interruptions. Therefore, in order to measure a process time of each of those interruptions, registers to hold a measurement start address and a measurement end address for each of the various processes and interruptions and/or registers to record measurement results need to be provided, as disclosed in Japanese Patent No. 2,595,718 (JP '718).

When an emulator of the microcomputer is provided for debugging of a program, restrictions on a circuit scale is comparatively light. However, in recent years, the microcomputer has a built-in debug function for debugging a program, a so-called on-chip debug function. In such a case, the restrictions on the circuit scale are comparatively heavy, thereby making it preferable to minimize redundant circuit configuration.

SUMMARY

In view of the above and other problems, the present disclosure provides configuration of a microcomputer having an on-chip debug function, for allowing it to be capable of measuring a process time of various processes without increasing a circuit scale and without forcing modification of statements of a user program to be modified for debugging.

In an aspect of the present disclosure, an on-chip debug circuit of a microcomputer is used for debugging a program, the on-chip debug circuit includes: a timer for measuring a time period between two events in a program execution time of a CPU, each of the two events may be specified by a user; and a measurement permission signal output unit for outputting a measurement permission signal that permits a measurement operation of the timer according to a user specified condition. The timer is configured to perform the measurement operation during an active period of the measurement permission signal.

By adopting such operation configuration, a required time of various processes is measured flexibly by using only one timer according to user-specified events or according to output conditions of the measurement permission signal. Therefore, besides avoiding modification to statements of a user program, the increase of the circuit scale due to having an on-chip debug circuit is minimized as much as possible.

Further, according to the microcomputer described-above, the measurement permission signal output unit specifies, as the measurement permission signal, an interrupt process signal that indicates that a CPU is involved in an interrupt process. Therefore, as a length of time between two events, an execution period during which the CPU is executing an interrupt process is measured by the timer. A non-execution period during which the CPU is not executing the interrupt process may also be measurable in the same manner.

Further, according to the microcomputer described-above, the measurement permission signal output unit includes: an interrupt level setting register for setting an interrupt level that either permits or prohibits the measurement operation of the timer, and a determination unit for determining by comparison a high-low relationship between an interrupt level of an interrupt process executed by the CPU and the interrupt level set by the interrupt level setting unit to output a determination signal. Further, the determination signal of the determination unit indicative of a determination result by the determination unit is specifiable as the measurement permission signal. Therefore, as a length of time between occurrences of two events, a time period during which the interrupt level of the interrupt process being executed by the CPU is higher than the interrupt level in the interrupt level setting register may be measured by using the timer.

Further, according to the microcomputer described-above, an interrupt hold signal output units outputs an interrupt hold signal that indicates that a low level interrupt process generated during processing of a high level interrupt process by the CPU is being kept on hold, and the measurement permission signal output unit may specify the interrupt hold signal as the measurement permission signal. Therefore, as a length of time between occurrences of two events, a time period during which the CPU is keeping the interrupt process on hold may be measured.

Further, according to the microcomputer described-above, an interrupt prohibition signal output unit outputs an interrupt prohibition signal that is active for a period during which an interrupt for the CPU is prohibited, and the measurement permission signal output unit may specify the interrupt prohibition signal as the measurement permission signal. Therefore, as a length of time between occurrences of two events, a time period during which the interrupt process for the CPU is prohibited may be measured.

Further, according to the microcomputer described-above, a comparison unit compares a start address setting register and an end address setting register respectively with a value of a program counter in the CPU. Further, the on-chip debug circuit specifies a comparison result of the comparison unit as the event. Therefore, if a start address and an end address of a subroutine program for performing a specific process are respectively set in corresponding registers, an execution time period of the subroutine program may be measured by the timer.

Further, according to the microcomputer described-above, the on-chip debug circuit specifies an edge of a level change of the interrupt process signal as an event. In other words, by detecting, as the events, the edges of the interrupt process signal changing at a start and an end of the interrupt process, the change of the interrupt level of the interrupt process signal is detected as an event (i.e., as a start event and an end event of the interrupt process), thus a time period required for the interrupt process may be measured by using the timer.

Further, according to the microcomputer described-above, the on-chip debug circuit specifies, as an event, an edge of the determination signal that is output from the determination unit. Therefore, a process time of the interrupt process that is considered as the measurement object according to the interrupt level set in the interrupt level setting register may be selectively measured.

Further, according to the microcomputer described-above, the on-chip debug circuit specifies, as an event, the edges of the interrupt hold signal, the interrupt level of which is changing at a start and an end of the signal. Therefore, a time period during which the interrupt process has been kept on hold may be measured by using the timer.

Further, according to the microcomputer described-above, the on-chip debug circuit specifies, as an event, the edges of the interrupt prohibition signal, the interrupt level of which is changing at a start and an end of the signal. Therefore, a time period during which the interrupt process has been prohibited may be measured by using the timer.

Further, according to the microcomputer described above, a maximum value storage register stores a maximum value of measurement result by the timer, and, after an end of the measurement operation of the timer, a maximum value update unit updates the maximum value storage register based on a comparison between (a) the measurement result by the timer in a latest measurement operation and (b) the maximum value stored in the maximum value storage register. If the result of the comparison indicates that the former value is greater than the latter value, the measurement result is written in the maximum value storage register for updating the maximum value storage register. Therefore, the maximum value of the measurement results by the timer is always available through an access to the maximum value register, after an end of the measurement operation of the timer.

Further, according to the microcomputer described above, a minimum value storage register stores a minimum value of measurement result by the timer, and a minimum value update unit updates the minimum value storage register based on a comparison between (a) the measurement result by the timer in a latest measurement operation and (b) the minimum value stored in the minimum value storage register, after an end of the measurement operation of the timer. If the result of the comparison indicates that the former value is smaller than the latter value, the measurement result is written in the minimum value storage register for updating the minimum value storage register. Therefore, the minimum value of the measurement result by the time is always available through an access to the minimum value register.

Further, according to the microcomputer described above, a measurement number counter counts a number of measurement operations of the timer, and an accumulation value register stores accumulation of the measurement results each time the timer finishes the measurement operation (i.e., an accumulation value register adds the latest measurement result to the current accumulation value for updating the accumulation value). Therefore, by dividing the accumulation value of the timer measurement results stored in the accumulation value register by the count value of the measurement number counter, the average of the timer measurement results is calculated.

Further, according to the microcomputer described above, the microcomputer is configured to be capable of transiting to a low electricity consumption mode when a supply of a system clock signal for the CPU is stopped, and, even in a transition period to such low electricity consumption mode, the system clock signal is supplied for the on-chip debug circuit if the on-chip debug circuit is in a functioning condition. Therefore, even when the microcomputer is transiting to such low electricity consumption mode, the on-chip debug circuit is capable of measuring the above-described time period.

BRIEF DESCRIPTION OF THE DRAWINGS

Objects, features, and advantages of the present disclosure will become more apparent from the following detailed description made with reference to the accompanying drawings, in which.

DETAILED DESCRIPTION (First Embodiment)

The first embodiment is explained with reference to FIGS. 1 to 4 in the following.

Figure 1:
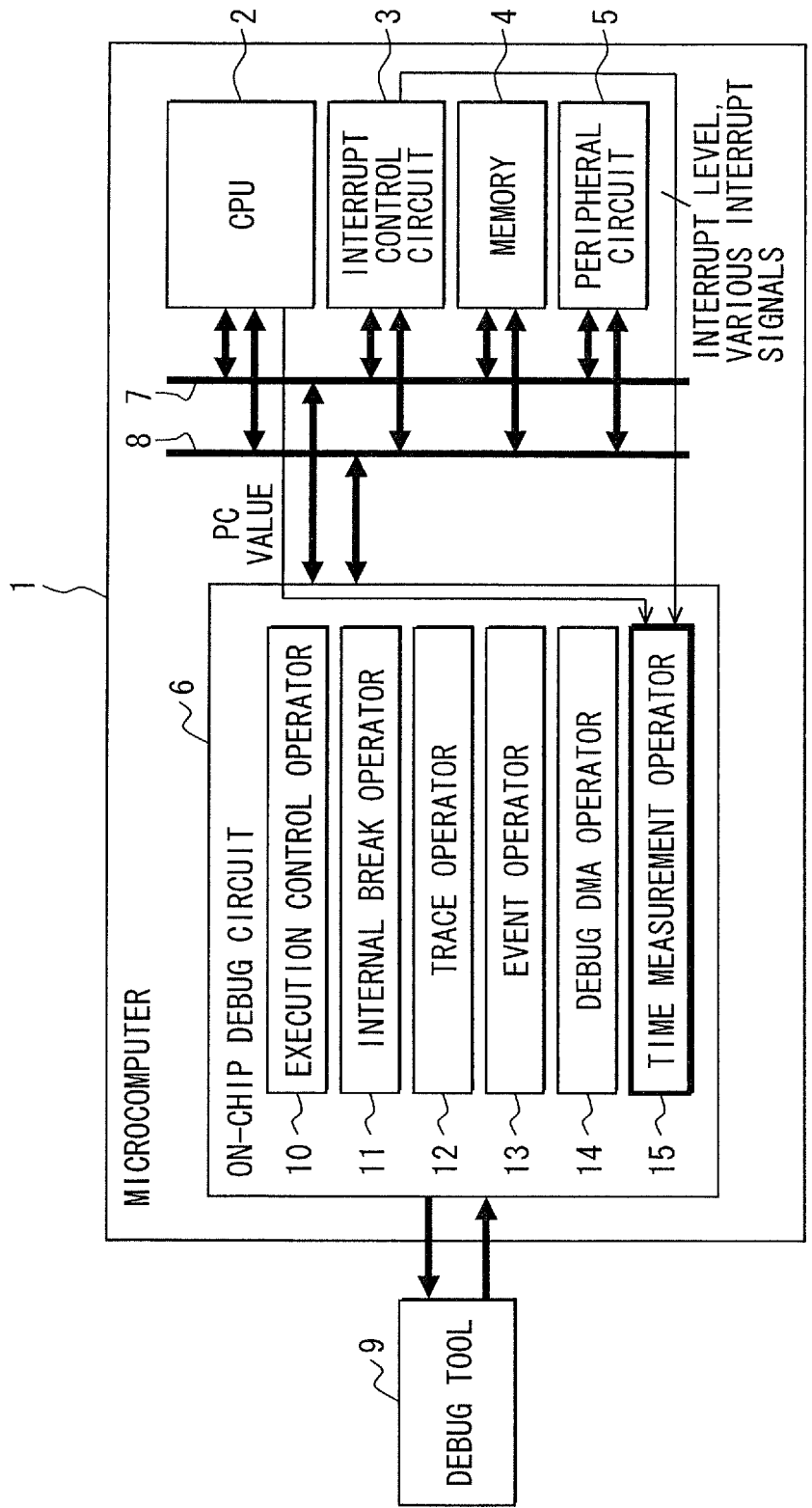
FIG. 1 is a block diagram of a microcomputer in an embodiment of the present disclosure.

FIG. 1 is a block diagram of a configuration of a microcomputer 1. The microcomputer 1 includes a CPU 2, an interruption control circuit 3, a memory 4, a peripheral circuit 5, and a debug circuit 6. The interruption control circuit 3 may be referred to as an interrupt process signal output unit, an interrupt hold signal output unit, an interrupt prohibition signal output unit in the claims. The debug circuit 6 may be referred to as an on-chip debug circuit in the claims. The CPU 2, the interruption control circuit 3, the memory 4, and the peripheral circuit 5 are components of a general microcomputer, and these components are connected with each other through an address bus 7 and a data bus 8.

The interruption control circuit 3 monitors various interrupt signals to the CPU 2, and generates, for example, the following signals: an interrupt level signal that indicates a degree of importance of an interruption; an interrupt process signal that becomes active when the CPU 2 performs an interrupt process; an interrupt hold signal that becomes active in a hold period of a low level interrupt process that is generated while the CPU 2 is performing a high level interrupt process; an interrupt prohibition signal that becomes active in a prohibition period during which an interrupt prohibition register (not illustrated) holds data being written thus prohibiting an output of an interrupt to the CPU 2.

The debug circuit 6, which is configured to have a nonvolatile memory such as a flash ROM, is used to debug a user program that is stored in the memory 4 and is executed by the CPU 2. The debug circuit 6 communicates with an external debug tool 9, and performs an operation to monitor register conditions and work memory conditions (i.e., conditions of RAM in the memory 4), according to a monitor program that is executed by the external debug tool 9.

The debug circuit 6 may include an execution control operator 10, an internal break operator 11, a trace operator 12, an event operator 13, a debug direct memory access (DMA) operator 14, and a time measurement operator 15. The execution control operator 10 controls the entire debug function executed by the debug circuit 6. The internal break operator 11 identifies a break function that stops an execution of a user program by the CPU 2 at a certain break point. The trace operator 12 traces an execution condition of the user program by the CPU 2. The event operator 13 monitors a specific user-specified event for triggering a desired process. The DMA operator 14 transfers data in the memory 4 to be retrieved by the debug tool 9.

Figure 2:
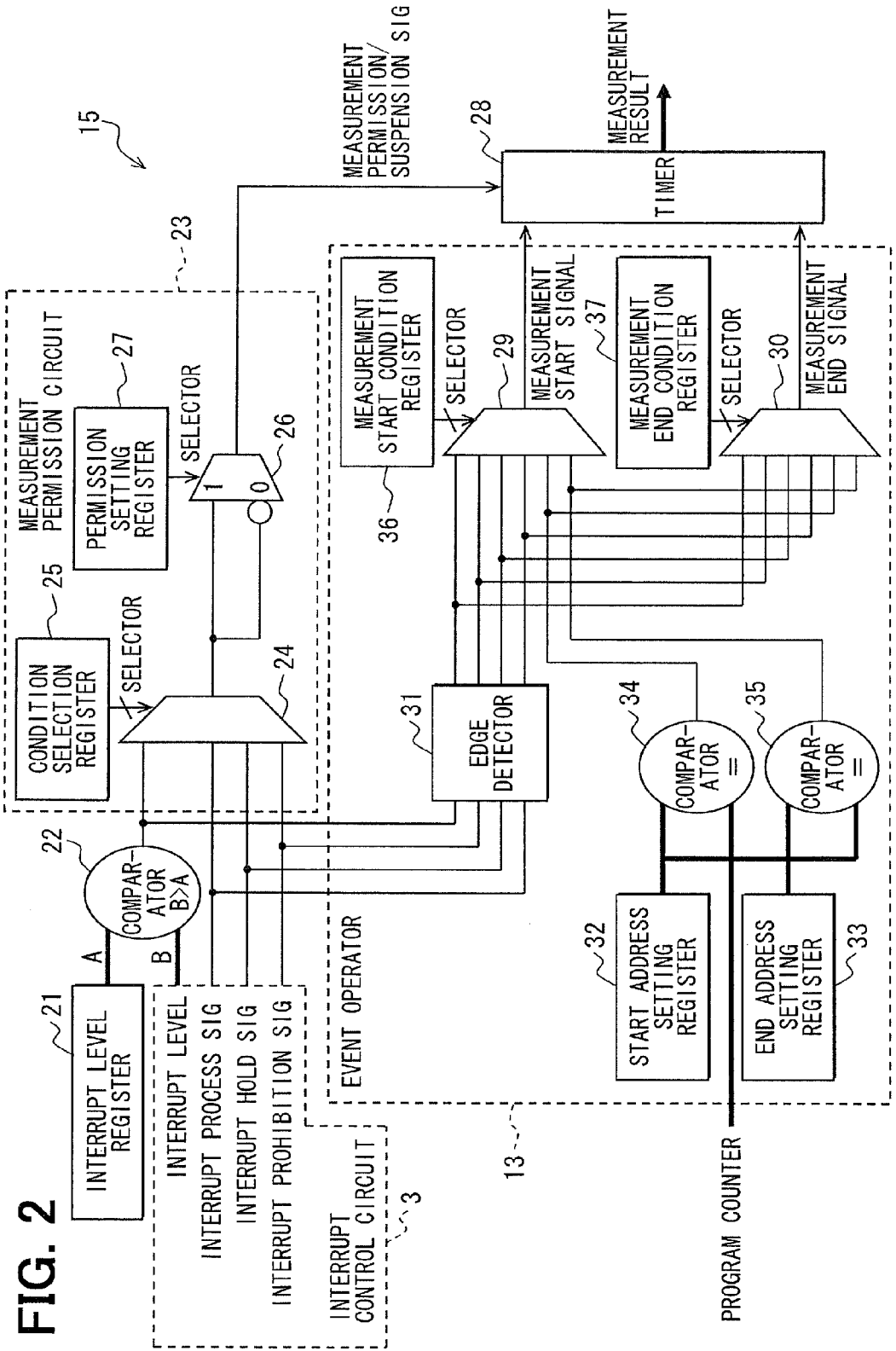
FIG. 2 is a block diagram of a time measurement operator and an event operator of the microcomputer of FIG. 1.

The time measurement operator 15 measures an execution time of various processes that are executed by the CPU 2. The details of the time measurement operator 15 are shown in FIG. 2 together with the event operator 13. An interrupt level register 21 receives a registered interrupt value (A) that is provided by the user with the use of the debug tool 9. The registered interrupt value (A) may be referred to as a registered value (A). The interruption control circuit 3 provides an interrupt level (B), and a comparator 22 compares the registered value (A) and the interrupt level (B). The comparator 22 may be referred to as the determination unit in the claims.

The comparator 22 outputs a signal to a selector 24 when the interrupt level (B) is greater than the register value (A). The selector 24 is part of a measurement permission circuit 23, and the measurement permission circuit 23 may be referred to as a measurement permission signal output unit in the claims. The selector 24 further receives from the interruption control circuit 3 the interrupt process signal, the interrupt hold signal, and the interrupt prohibition signal, as described earlier.

Along with the selector 24, the measurement permission circuit 23 also includes a condition selection register 25, a permission setting register 27, and a selector 26. The selector 24 selects the signal to output to the selector 26, based on the value registered in the condition selection register 25. The value registered in the condition selection register 25 is provided by the user with the use of the debug tool 9, and indicates either the output signal from the comparator 22; the interrupt process signal; the interrupt hold signal; or the interrupt prohibition signal. The selected signal is then provided to the selector 26.

According to a value registered in the permission setting register 27, the selector 26 selects either an output signal from the selector 24 or a negative-true logic signal of the output signal from the selector 24. The output signal from the selector 26 is then provided to a timer 28 as a measurement permission/suspension signal (i.e., a measurement permission signal in claims). The value registered in the permission setting register 27 is provided by the user with the use of the debug tool 9, just like the condition selection register 25. When the measurement permission/suspension signal from the selector 26 is a high level period, the timer 28 performs a time measurement operation. When the measurement permission/suspension signal from the selector 26 is a low level period the timer 28 temporarily stops the time measurement operation.

The event operator 13 includes a selector 29 and a selector 30. The timer 28 receives a measurement start signal from the selector 29 and receives a measurement end signal from the selector 30, which will be described further below.

The event operator 13 further includes an edge detector 31 that receives the same input signals as the selector 24, which includes the output signal from the comparator 22, and the interrupt process signal, the interrupt hold signal, and the interrupt prohibition signal from the interruption control circuit 3. When the edge detector 31 detects a rising edge or a falling edge of each of the input signals, it generates a one-shot pulse signal for each detection, and outputs the pulse signal to the selectors 29, 30. In other words, the measurement start signal and the measurement end signal respectively become active to correspond to a generation of an event. For simplicity, the edge detector 31 is depicted with four output lines. However, the rising edges and the falling edges of each of those signals are detected separately, thus the number of the output lines may actually be eight. Further, each of the selectors 29, 30 is individually capable of selecting a rising edge input and a falling edge input.

Further, the event operator 13 may include a start address setting register 32, an end address setting register 33, a comparator 34, a comparator 35, a measurement start condition register 36, and a measurement end condition register 37. The comparator 34, 35 may be referred to as a comparison unit. The comparator 34 compares a register value of the start address setting register 32 with a value of a program counter of the CPU 2 (not illustrated). The comparator 35 compares a register value of the end address setting register 33 with the value of the program counter. When the value in the start address setting register 32 matches the value of the program counter, the comparator 34 outputs a signal to the selectors 29, 30. Similarly, the comparator 35 outputs a signal to the selectors 29, 30 when the input values match.

The measurement start condition register 36 and the measurement end condition register 37 both include an input value registered by the user with the use of the debug tool 9. The selector 29 selects from the various input signals based on the value registered in the measurement start condition register 36. Similarly, the selector 30 selects from the various input signals based on the value registered in the measurement end condition register 37.

Figure 3:
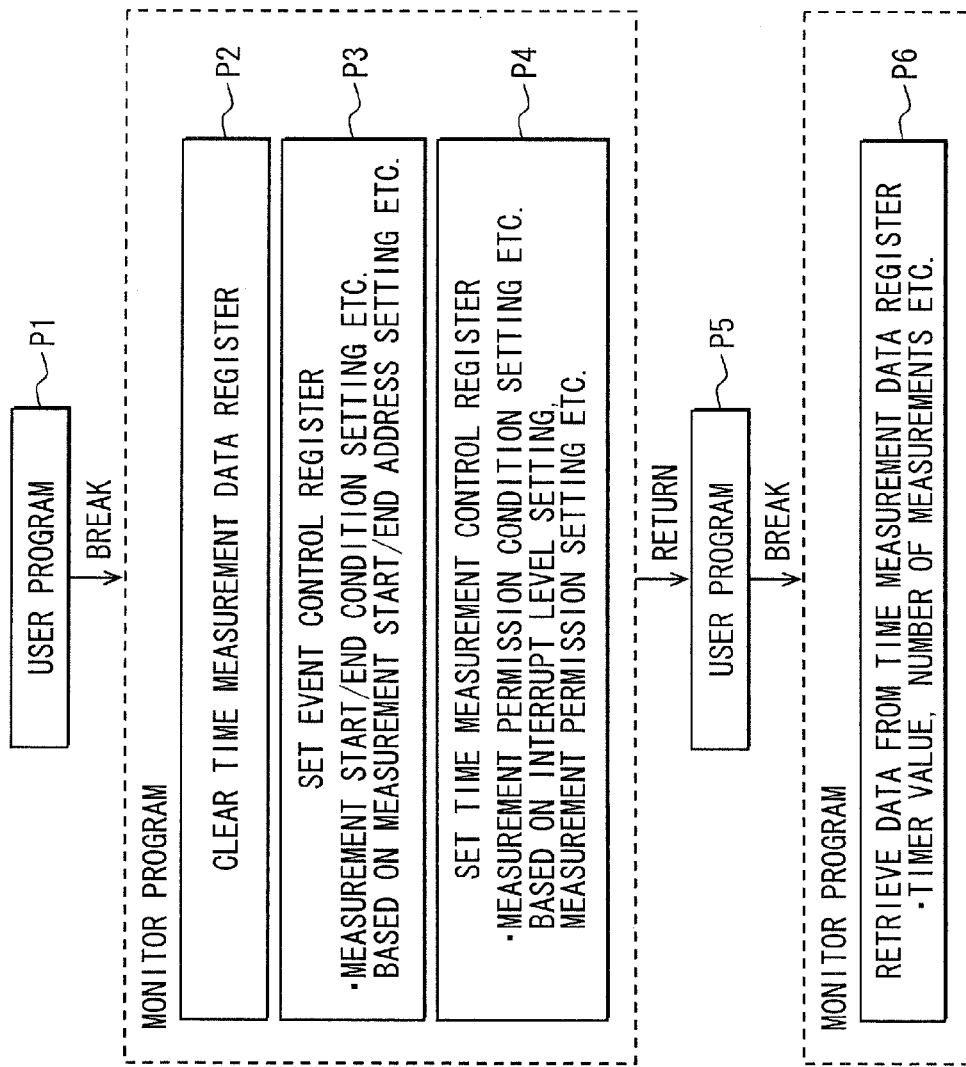
FIG. 3 is a flowchart for a process time measurement in debugging of a user program for microcomputer of FIG. 1.

The advantageous effects of the present embodiment are explained with reference to FIGS. 3 and 4 in the following. During a debugging operation of a user program the process shown in FIG. 3 is carried out for measuring a process time of a certain process with the use of the timer 28. In step P1, when the CPU 2 executes a user program, the process with the use of the debug tool 9 breaks the execution of the user program in the middle, and executes a monitor program. In step P2, the process clears the timer 28 and a time measurement data register (not illustrated), which receives a transferred time measurement value from the timer 28. In step P3, the process sets the event control registers by writing a time measurement start address (i.e. a generated event) and a time measurement end address (i.e. another event) in the start address setting register 32 and in the end address setting register 33, respectively. Also, the measurement start condition register 36 and the measurement end condition register 37 are respectively set.

In step P4, the process sets time measurement control register by setting an interrupt level that is measured as a measurement object to the interrupt level register 21, and the condition selection register 25 as well as the permission setting register 27 are respectively set. In step P5, the process completes the monitor program and executes the user program, and the user program, which is being executed, receives another break by the debug tool 9 during the execution, for the execution of the monitor program. In step P6, the process retrieves the timer value of the timer 28 and the number of measurements, which is described later. Further, if necessary, the process returns to step P2 to perform a setting process for measuring a process time again.

Figure 4:
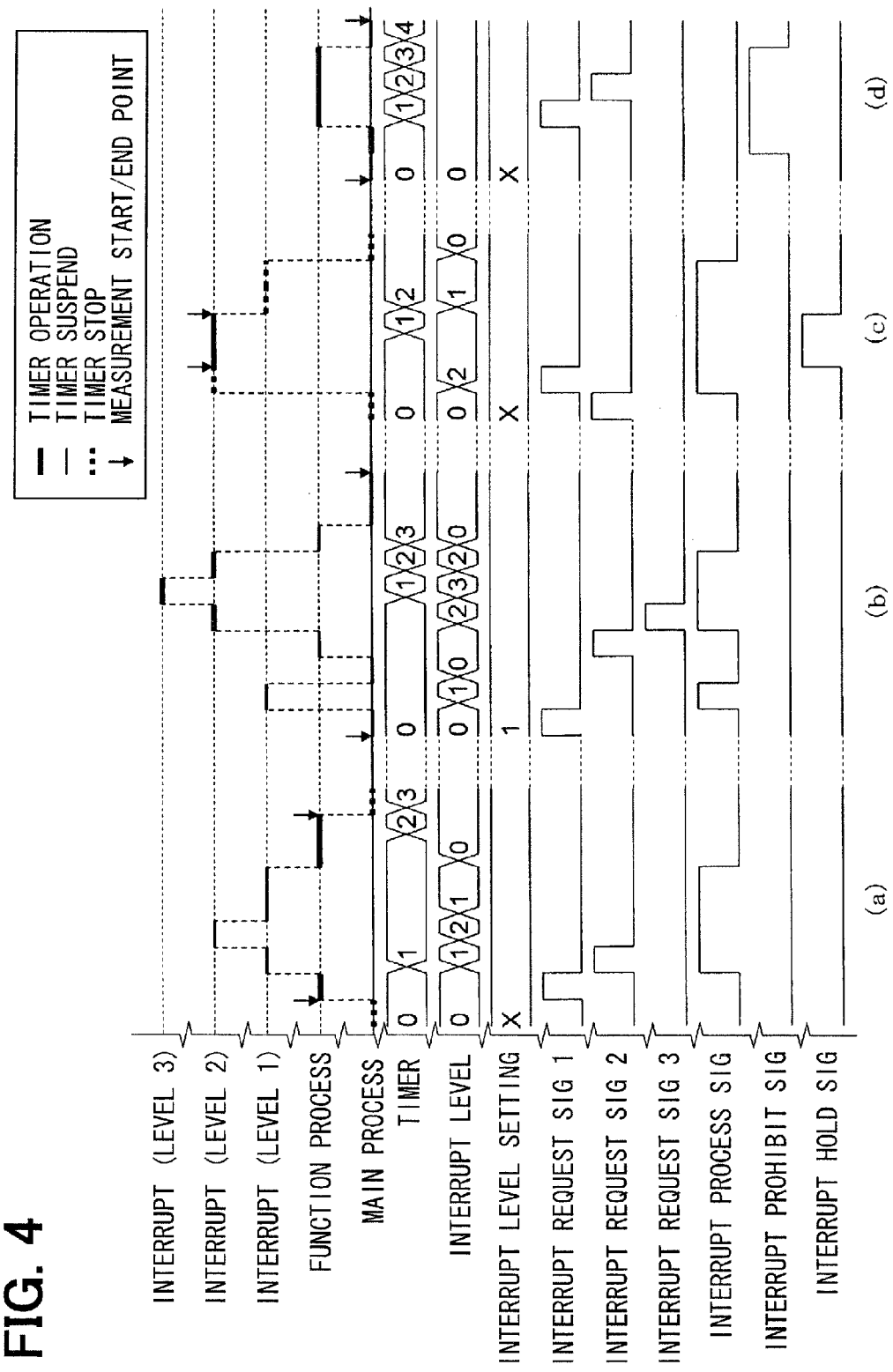
FIG. 4 is a timing chart of four patterns of the process of FIG. 3.

In FIG. 4, a timing chart of four different process time measurement patterns (a to d) are shown. In the timing chart, a broken line indicates a time period where the time measurement by the timer 28 is stopped (i.e., a start event not yet generated condition), and a thick line indicates a time period where the time measurement is performed by the timer 28, and a thin line indicates a time period where the time measurement by the timer 28 is temporarily stopped (i.e., suspended).

Pattern "a" of FIG. 4 is a timing chart under a measurement condition according to the following register settings:

| | |
|---|---|
| Interrupt Level Register 21: | An interrupt level "X" (Any level) |
| Condition Selection Register 25: | An interrupt process signal |
| Permission Setting Register 27: | "0" (Stop) |
| Start Address Setting Register 32: | 0xA00000 |
| End Address Setting Register 33: | 0xB00000 |
| Measurement Start Condition Register 36: | Comparator 34 |
| Measurement End Condition Register 37: | Comparator 35 |

In this case, a value written in the measurement start condition register 36 corresponds to a start address of a function process (i.e., a process of a subroutine), and a value written in the measurement end condition register 37 corresponds to an end address of a function process. If the interrupt is generated during the execution of the function process, the interrupt process signal becomes active. Because the selector 26 outputs an inverted signal of such interrupt signal, the time measurement operation of the timer 28 is stopped during an active period of the interrupt process signal. As a result, the timer 28 measures only the execution time of the function process.

Pattern "b" of FIG. 4 is a timing chart under a measurement condition according to the following register settings:

| | |
|---|---|
| Interrupt Level Register 21: | An interrupt level "1" |
| Condition Selection Register 25: | Comparator 22 |
| Permission Setting Register 27: | "1" |
| Start Address Setting Register 32: | 0x000000 |
| End Address Setting Register 33: | 0xFFFFFE |
| Measurement Start Condition Register 36: | Comparator 34 |
| Measurement End Condition Register 37: | Comparator 35 |

In this case, a value written in the measurement start condition register 36 corresponds to a start address of a main routine process, and a value written in the measurement end condition register 37 corresponds to an end address of the main routine process. In such a case, the time measurement operation by the timer 28 is permitted when the interrupt level is higher than "1." Therefore, if an interrupt of level "2" or higher is generated during the execution of the function process, the execution time of such interrupt process is only measured. In such case, the interrupt generated during the execution of the main routine may also be measured in the same manner.

Pattern "c" of FIG. 4 is a timing chart under a measurement condition according to the following register settings:

| | |
|---|---|
| Interrupt Level Register 21: | An interrupt level "X" |
| Condition Selection Register 25: | An interrupt process signal |
| Permission Setting Register 27: | "1" |
| Start Address Setting Register 32: | 0x000000 (Or any address) |
| End Address Setting Register 33: | 0xFFFFFE (Or any address) |
| Measurement Start Condition Register 36: | A rising edge of an interrupt hold signal |
| Measurement End Condition Register 37: | A falling edge of an interrupt hold signal |

The values written in the measurement start condition register 36 and in the measurement end condition register 37 may be same as the values in pattern "b" of FIG. 4, or may be any value. In such case, the interrupt hold signal becomes active during a time period where a level-1 interrupt that is generated in a processing period of a preceding level-2 interrupt is put on hold. Therefore, at the rising edge of the interrupt hold signal, the measurement by the timer 28 is started, and at the falling edge of the interrupt hold signal, the measurement by the timer 28 is ended. Further, during the interrupt process period, the measurement by the timer is permitted. As a result, a hold time of the level-1 interrupt process is measured.

In such a case, the interrupt hold signal is replaceable with the interrupt process signal for the same measurement. In other words, the measurement by the timer 28 may be configured to start at the rising edge of the interrupt process signal and may be configured to end at the falling edge of the interrupt process signal, for permitting the measurement by the timer 28 during an interrupt hold signal active period.

Pattern "d" of FIG. 4 is a timing chart under a measurement condition according to the following register settings:

| | |
|---|---|
| Interrupt Level Register 21: | An interrupt level "X" |
| Condition Selection Register 25: | An interrupt prohibition signal |
| Permission Setting Register 27: | "1" |
| Start Address Setting Register 32: | 0x000000 |
| End Address Setting Register 33: | 0xFFFFFE |
| Measurement Start Condition Register 36: | Comparator 34 |
| Measurement End Condition Register 37: | Comparator 35 |

The values written in the measurement start condition register 36 and in the measurement end condition register 37 are same as the values in pattern "b" of FIG. 4. Though the level-1 interrupt and the level-2 interrupt are generated during the execution of the function process, such interrupt processes are being prohibited, and the measurement by the timer 28 is permitted during an interrupt prohibition signal active period. As a result, a time period that prohibits the interrupt process is measured.

Similar to the situation in pattern "c" of FIG. 4, the measurement by the timer 28 may be configured to start at the rising edge of the interrupt prohibition signal and may be configured to end at the falling edge of the interrupt prohibition signal, for permitting the measurement by the timer 28 during an interrupt process signal in-active period.

The present embodiment exerts the following advantageous effects.

The microcomputer 1 has the debug circuit 6, which includes the timer 28 for measuring a time period between two events in the program execution period of the CPU 2 and the measurement permission circuit 23 for outputting the measurement permission signal according to the user specified conditions. The timer 28 performs the measurement operation during a measurement permission signal active period. Therefore, according to user specified events and measurement permission signal output conditions, the timer 28 can be employed to measure various process times in a flexible manner. Thus, the increase of the circuit scale by having the debug circuit 6 in microcomputer 1 is minimized, and modification of statements in the user program is avoided.

More practically, the measurement permission circuit 23 includes the interrupt level register 21 for setting the interrupt level that either permits or prohibits the time measurement operation, and the comparator 22 for determining by comparison a high-low relationship between an interrupt level of an interrupt process executed by the CPU 2 and an interrupt level written in the interrupt level register 21. Further, the determination result of the comparator 22 is specified as the measurement permission signal. Therefore, as a length of time between occurrences of two events, a time period during which the interrupt level of the interrupt process being executed by the CPU 2 is higher than the interrupt level in the interrupt level register 21 is measured by using the timer 28.

In addition, the comparators 34, 35 compare the value written in the start address setting register 32 and in the end address setting register 33 with the value of the program counter of the CPU 2. Then, the debug circuit 6 generates events from the comparison results from the comparators 34, 35. Therefore, an execution time of a specific function process program is measured by the timer 28 by setting a start address and an end address of the specific function process program to corresponding registers 32, 33.

Therefore, even if an interrupt is generated during the execution of the function process by the CPU 2, one of the execution time of the function process and the execution time of the interrupt process is measured by using only one timer 28 that is shared with various processes. Thus, with a minimum increase of the circuit scale to the debug circuit 6 and without a large scale modification of the user program to be debugged, the execution time of the function process or the execution time of the interrupt process is measured. Further, even when multiple interrupt levels (i.e., multiple degrees of importance of interrupt) are used, such interrupt levels are used to select the measurement object about which the process execution time is measured.

Furthermore, the measurement permission circuit 23 is configured such that various signals may be used as the interrupt permission/suspension signal. For example, the interrupt process signal indicative of the interrupt process being executed by the CPU 2; the interrupt hold signal indicative of the holding of a low level interrupt process by the CPU 2, which is generated during the processing of a high level interrupt process; and the interrupt prohibition signal becoming active in an interrupt prohibition period that prohibits an interrupt for the CPU 2. Therefore, various time periods between two events are measured by using the timer 28, such as the execution period of the interrupt process by the CPU 2, the non-execution period of the interrupt process, the interrupt hold period, the interruption prohibition period, and the like.

In addition, the debug circuit 6 is configured such that the edges of various signals may be used to specify events by the selectors 29, 20. For example, the edges of the interrupt process signal detected as the change of the interrupt levels; the edges of a comparison signal (i.e., the determination signal) from the output of the comparator 22 that determines the interrupt level; the edges of the interrupt hold signal detected as the change of the interrupt levels; and the edges of the interrupt prohibition signal detected as the change of the interrupt levels. Therefore, various process times, such as, the interrupt process hold time, the interrupt process prohibition time, and the like are measured by the timer 28.

(Second Embodiment)

Figure 5:
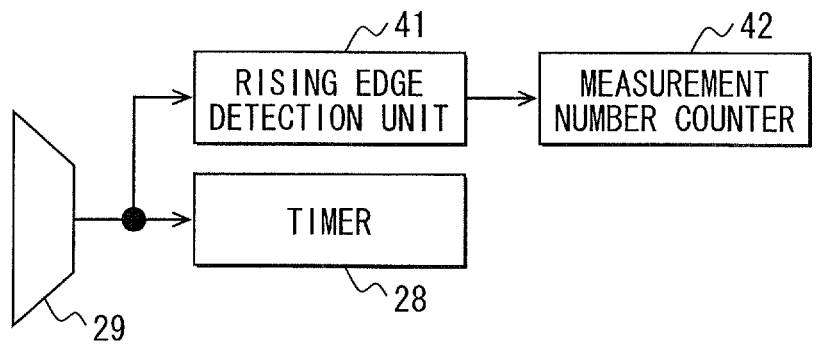
FIG. 5 is a block diagram of a portion of the microcomputer shown in FIG. 2 in a second embodiment.
Figure 6:
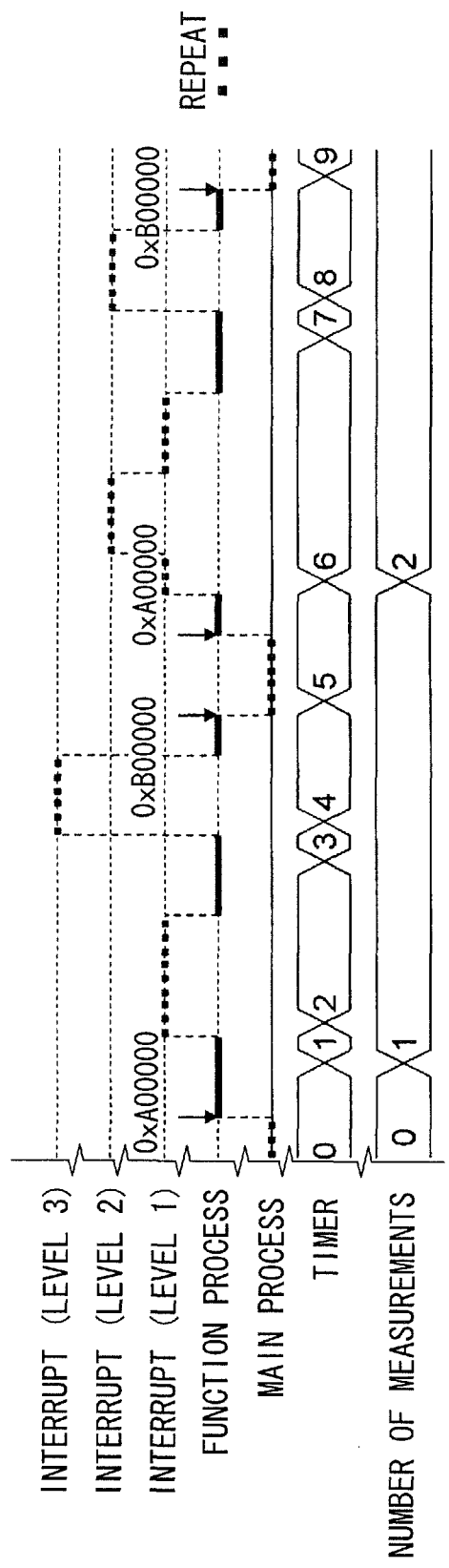
FIG. 6 is a timing chart for process time measurement.

FIGS. 5 and 6 are used to explain the second embodiment. Like parts have like numbers as in the first embodiment, and the difference from the first embodiment is explained in the following. FIG. 5 is a part of the illustration in FIG. 2 that is modified in the second embodiment to include a rising edge detection unit 41 for detecting a rising edge of the output signal from the selector 29 and a measurement number counter 42 for counting the number of outputs from the rising edge detection unit 41. The rising edge detection unit 41 outputs a one-shot pulse signal each time it detects a rising edge of the output signal from the selector 29.

FIG. 6 is a timing chart of a measurement condition according to the same register settings as pattern "a" of FIG. 4 in the first embodiment. In the second embodiment, each time the value of the program counter in the CPU 2 shows a start address 0xA00000, a measurement by the timer 28 is performed, after the start of the execution of the function process. In such case, when the value of the counter reaches an end address 0xB00000, the measurement value of the timer 28 will not be initialized, and the measurement results are accumulated.

Thus, the measurement number counter 42 stores how many times the measurement by the timer 28 has been started so far. Therefore, an average execution time of the function process is calculated by performing a division of the measurement value of the timer 28 divided by the count value of the measurement number counter 42 after retrieving those values from a monitor program, which is executed after execution of a user program for a predetermined period and stopping of the user program by having a break.

As described above, the number of time measurements by using the timer 28 is counted by the measurement number counter 42 and multiple time executions of a function process are continuously measured by the timer 28 in the second embodiment, for the purpose of calculating an average execution time of the function process. Therefore, by dividing the measurement value of the timer 28 at a certain point of time by the above multiple execution times, the average execution time of the function process is calculated.

(Third Embodiment)

Figure 7:
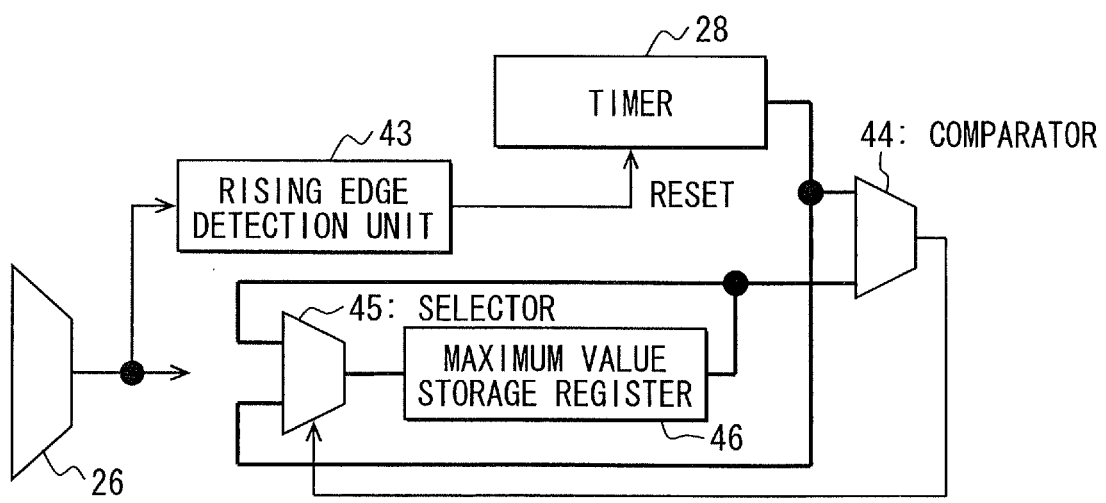
FIG. 7 is a block diagram of a portion of the microcomputer shown in FIG. 2 in a third embodiment.
Figure 8:
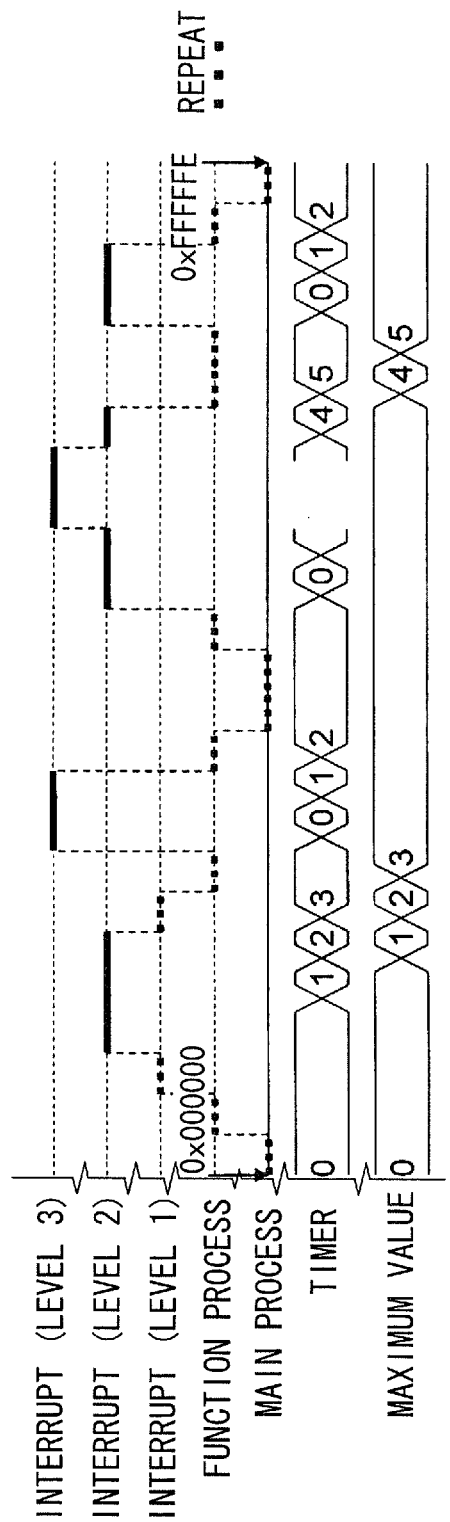
FIG. 8 is a timing chart for process time measurement.

FIGS. 7 and 8 are use to explain the third embodiment. Like parts have like numbers as in the first embodiment, and the difference from the first embodiment is explained in the following. FIG. 7 is a part of the illustration in FIG. 2 that is modified in the third embodiment to include a rising edge detection unit 43 that outputs a one-shot pulse signal each time it detects a rising edge from the output signal from the selector 26. The output signal from the rising edge detection unit 43 is inputted to the timer 28 as a reset signal. Further, the measurement data of the timer 28 is provided to a comparator 44 and a selector 45. An output side of the selector 45 has a maximum value storage register 46 connected thereto, and a register value of the maximum value storage register 46 is also provided for the comparator 44 and the selector 45. In other words, the comparator 44 compares a measurement data value of the timer 28 with a register value of the maximum value storage register 46, so that the selector 45 selects a greater value, which is in this case the measurement data value of the timer 28, and the selected value from the selector 45 is written in the maximum value storage register 46.

FIG. 8 is a timing chart of a measurement condition according to the same register settings as pattern "b" of FIG. 4 in the first embodiment. In the third embodiment, the measurement operation of the timer 28 is permitted for the interrupt level of 2 or higher. During the operation of the timer 28 permitted in the above-described manner, an interrupt having interrupt level of 2 or lower cannot generate a new interrupt (i.e., a dead zone). Further, the measurement by the timer 28 is reset each time an interrupt of level 2 or higher is generated. In a situation of FIG. 8, the maximum value "5" of the timer measurement data is stored in the maximum value storage register 46.

As described above, when the timer 28 measures time according to the measurement permission signal that is output from the selector 26, the data of the execution time that is measured by the timer 28 is stored in the maximum value storage register 46. Further, the timer 28 is configured to be reset each time the measurement permission signal became active, and the comparator 44 is configured to update a stored value in the maximum value storage register 46 to a current data value measured by the timer 28, if the current data value is larger than the stored value in the maximum value storage register 46. Therefore, a maximum value of a time period that corresponds to the dead zone is measured, during which an interrupt having a certain interrupt level cannot generate a new interrupt.

(Fourth Embodiment)

Figure 9:
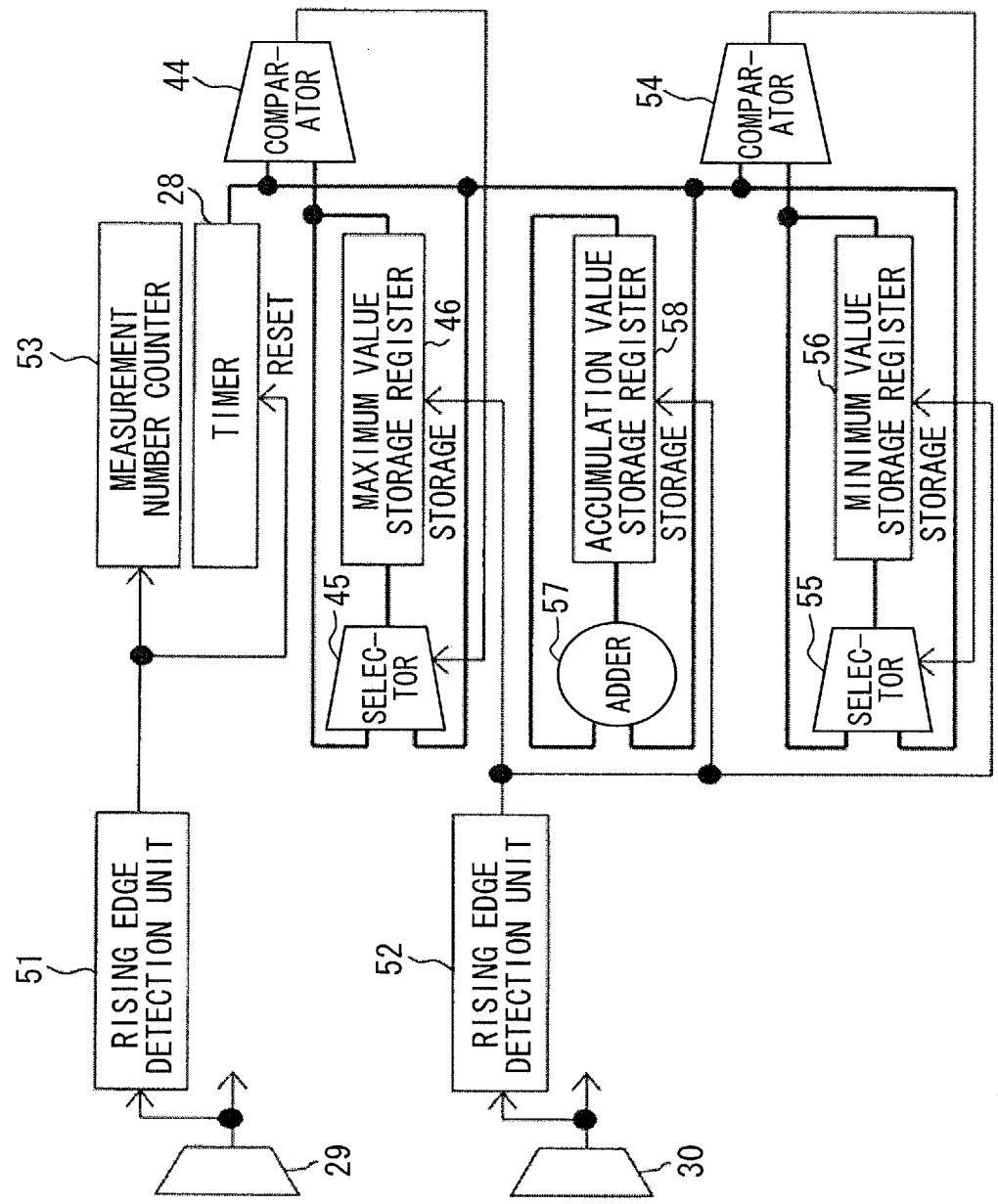
FIG. 9 is a block diagram of a portion of the microcomputer shown in FIG. 2 in a fourth embodiment.

FIGS. 9 to 12 illustrate the fourth embodiment. In the second embodiment, a configuration for measuring and calculating the average execution time of the function process is disclosed, and, in the third embodiment, a configuration for measuring and calculating the maximum value of time interval corresponding to "a dead zone" is disclosed. In the fourth embodiment, the two types of measurement and calculation described above are enabled in one configuration, and, in addition, the measurement and calculation of the minimum value of time interval between two interrupts is also enabled. FIG. 9 in the fourth embodiment corresponds to a combination of FIGS. 5 and 7, and the output terminals of the selectors 29 and 30 respectively have a rising edge detection unit 51 and 52. The output signal from the rising edge detection unit 51 is provided to a measurement number counter 53 for counting the number of outputs, and the same signal is provided to the timer 28 as a reset signal. The output signal from the rising edge detection unit 52 is provided to the maximum value storage register 46 (i.e., a maximum value update unit) as a data storage timing signal for indicating a storage timing of the output data from the selector 45.

Further, a comparator 54, a selector 55, and a minimum value storage register 56 are coupled in the same manner as the connection between the comparator 44 (i.e., a maximum value update unit), the selector 45, and the maximum value storage register 46 (as provided in FIG. 9 and similar to FIG. 7). The comparator 54 (i.e., a minimum value update unit) compares the timer value of the timer 28 and the data value stored in the minimum value storage register 56, and outputs a selection switch signal to the selector 55, to selectively output a smaller one of two values to the minimum value storage register 56.

An adder 57 inputs a signal to an accumulation value storage register 58. The register value stored in the accumulation value storage register 58 is fed back into the adder 57. In addition the timer value of the timer 28 is also provided to the adder 57. The adder 57 outputs the addition result of the values received by the adder 57 to the accumulation value storage register 58. The output signal from the rising edge detection unit 52 is provided to the minimum value storage register 56 and to the accumulation value storage register 58 as a data storage timing signal.

Figure 10:
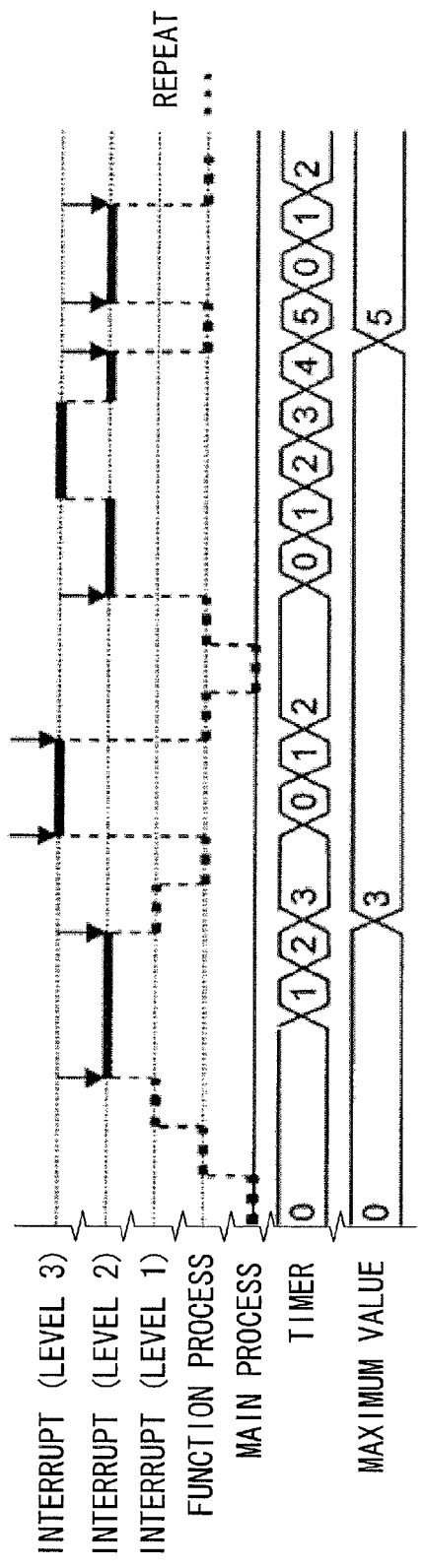
FIG. 10 is a timing chart for process time measurement in the fourth embodiment

The advantageous effects of the fourth embodiment are explained with reference to FIGS. 10 to 12. FIG. 10 is a timing chart similar to the third embodiment, depicting an acquisition of the maximum value of the time period during which an interrupt having interrupt level of 2 or lower cannot generate a new interrupt (i.e., a dead zone). In this case, each of the registers is set in the following manner.

| | |
|---|---|
| Interrupt Level Register 21: | An interrupt level "1" |
| Condition Selection Register 25: | Comparator 22 |
| Permission Setting Register 27: | "1" |
| Start Address Setting Register 32: | Any value |
| End Address Setting Register 33: | Any value |
| Measurement Start Condition Register 36: | A rising edge of comparator 22 |
| Measurement End Condition Register 37: | A falling edge of comparator 22 |

According to the above setting, the timer 28 can measure the time period for processing an interrupt having interrupt level of 2 or higher, and, upon detecting the falling edge of the comparator 22, the data storage timing signal is output to the maximum value storage register 46 through the selector 30 and the rising edge detection unit 52. In such manner, the timer value having been measured at such timing and the data value stored in the maximum value storage register 46 are compared to store a greater one of the two values in the maximum value storage register 46. Then, upon detecting the rising edge of the comparator 22, the reset signal is output to the timer 28 through the selector 29 and the rising edge detection unit 51. In an example shown in FIG. 10, the maximum value stored in the maximum value storage register 46 changes from "0" to "3" to "5."

Figure 11:
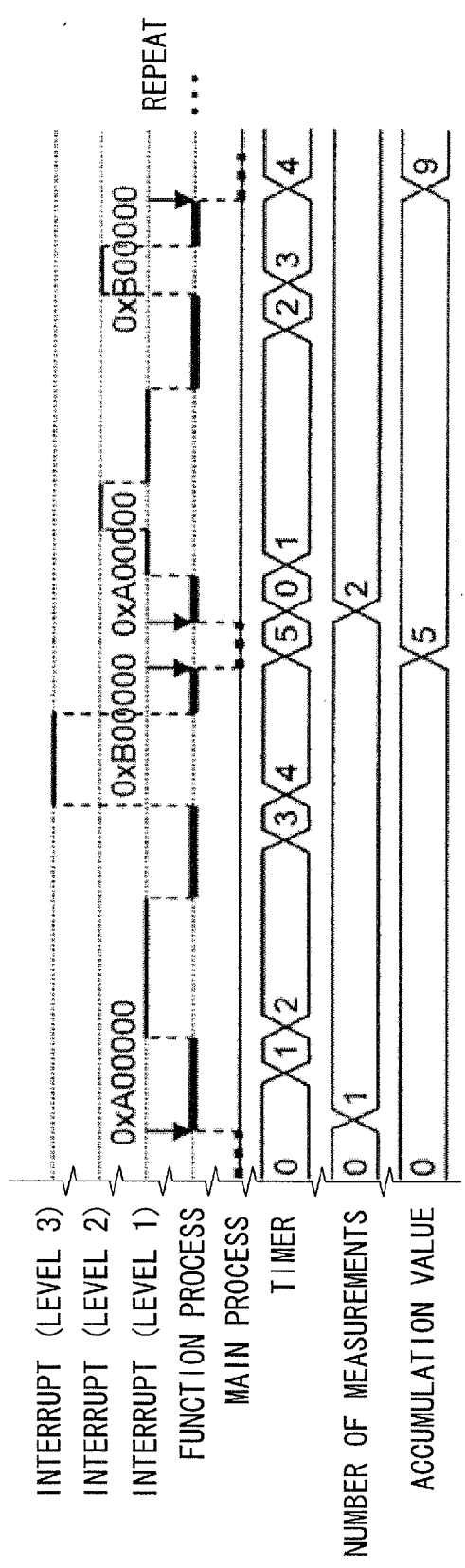
FIG. 11 is a timing chart for process time measurement in the fourth embodiment.

FIG. 11 shows a timing chart similar to the second embodiment. That is, the acquisition timing of the average execution time of the function process is depicted. In this case, each of the registers is set in the following manner.

| | |
|---|---|
| Interrupt Level Register 21: | An interrupt level "0" |
| Condition Selection Register 25: | Comparator 22 |
| Permission Setting Register 27: | "0" |
| Start Address Setting Register 32: | 0xA00000 |
| End Address Setting Register 33: | 0xB00000 |
| Measurement Start Condition Register 36: | Comparator 34 |
| Measurement End Condition Register 37: | Comparator 35 |

According to the above setting, after the start of the execution of the function process, the timer 28 is reset and the measurement operation is started each time the value of the program counter of the CPU 2 indicates the start address 0xA00000. Then, when the value of the program counter reaches the end address 0xB00000, the measurement value of the timer 28 is stored in an accumulative manner in the accumulation value storage register 58 through the adder 57. In addition, the measurement number counter 53 stores the count of the starting of the measurements by the timer 28. Therefore, after the execution of the user program for a certain period of time, the execution of the user program is stopped by break, and the value in the accumulation value storage register 58 and the count value of the measurement number counter 53 are used to calculate the average execution time of the function process, by dividing the former value by the latter value. In an example shown in FIG. 11, the accumulation value of the accumulation value storage register 58 changes from "0" to "5" to "9," and the count value of accumulation value storage register 58 changes from "0" to "1" to "2."

Figure 12:
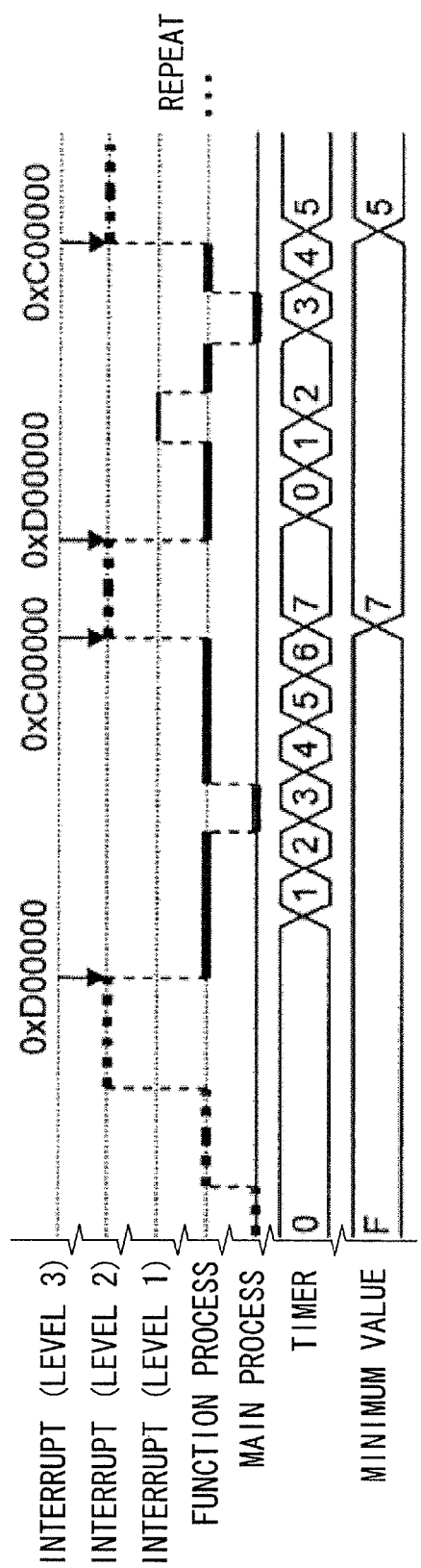
FIG. 12 is a timing chart for process time measurement that measures a minimum time measurement pattern between interruptions.

Further, FIG. 12 shows a timing chart of the acquisition timing of the minimum value of the interval between two interrupts of level 2. In this case, each of the registers is set in the following manner.

| | |
|---|---|
| Interrupt Level Register 21: | An interrupt level "0" |
| Condition Selection Register 25: | Comparator 22 |
| Permission Setting Register 27: | "0" |
| Start Address Setting Register 32: | 0xD00000 |
| End Address Setting Register 33: | 0xC00000 |
| Measurement Start Condition Register 36: | Comparator 34 |
| Measurement End Condition Register 37: | Comparator 35 |

In this case, the address 0xC00000 is a start address of a subroutine for processing an interrupt of level "2" or higher, and the address 0xD00000 is an end address of such subroutine.

According to the above setting, the timer 28 starts the measurement operation after reset when the value of the program counter reaches the end address 0xD00000, and finishes the measurement operation when the value reaches the start address 0xC00000. Then, a smaller one of the timer value at that moment (i.e., the moment of finishing the latest measurement) and the data value stored in the minimum value storage register 56 is stored in the minimum value storage register 56. In an example of FIG. 12, the minimum value stored in the minimum value storage register 56 changes from "F" to "7" to "5."

According to the fourth embodiment, the maximum value storage register 46 stores the maximum value of the measurement result by the timer 28, and, after an end of the measurement operation of the timer 28, the comparator 44 compares the measurement result by the timer 28 in a latest measurement operation with the maximum value stored in the maximum value storage register 46. If the result of the comparison indicates that the former value is greater than the latter value, the measurement result is written in the maximum value storage register 46 through the selector 45 for updating the maximum value. Therefore, the maximum value of the measurement result by the timer 28 is always available through an access to the maximum value storage register 46.

Further, the minimum value storage register 56 stores the minimum value of the measurement result by the timer 28, and, after an end of the measurement operation of the timer 28, the comparator 54 compares the measurement result by the timer 28 in a latest measurement operation with the minimum value stored in the minimum value storage register 56. If the result of the comparison indicates that the former value is smaller than the latter value, the measurement result is written in the minimum value storage register 56 through the selector 55 for updating the minimum value. Therefore, the minimum value of the measurement results by the timer 28 is always available through an access to the minimum value storage register 56.

Further, the measurement number counter 53 counts the number of measurement operations of the timer 28, and the measurement results are added in an accumulative manner by the adder 57, and the accumulation value of the measurement results is stored in the accumulation value storage register 58 when the measurement operation of the timer 28 is finished. Therefore, by dividing the accumulation value stored in the accumulation value storage register 58 by the count value of the measurement number counter 53, the average of the measurement results by the timer 28 can be calculable.

(Fifth Embodiment)

Figure 13:
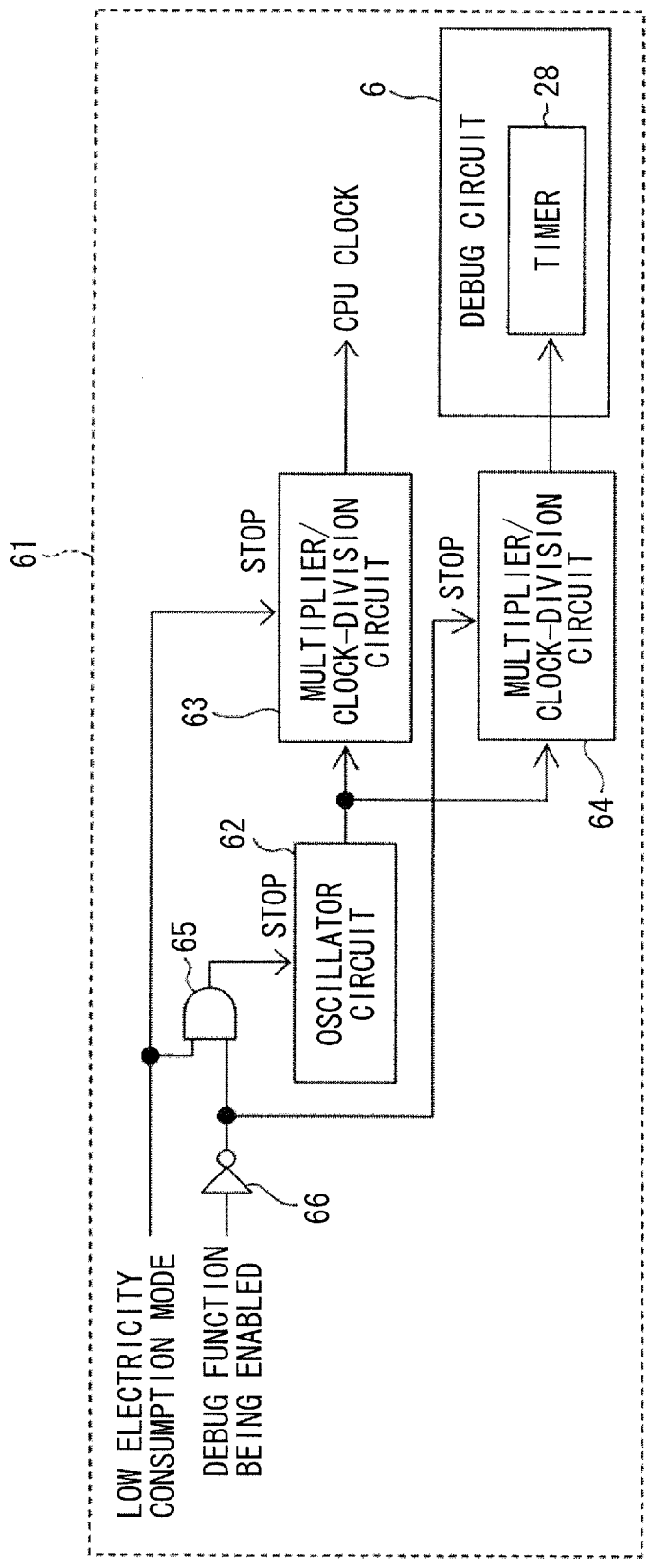
FIG. 13 is a block diagram of a clock signal providing portion of the microcomputer in a fifth embodiment.

FIG. 13 illustrates the fifth embodiment. The fifth embodiment has an assumption that the microcomputer 61 having the on-chip debug function is capable of transiting from a normal operation mode to a sleep/standby mode (i.e., a low electricity consumption mode), in which a supply of a system clock signal for the CPU 2 or the like is stopped. FIG. 13 shows a block diagram of only a clock signal providing portion of the microcomputer 61. A oscillator circuit 62 is implemented as an oscillator circuit having a CR oscillator circuit, a crystal oscillator or the like, and outputs a standard clock signal having a frequency in an order of kHz.

The standard clock signal is input to, for example, two multiplier/clock-division circuits 63, 64, both of which are an analog/digital phase locked loop circuit (PLL circuit). The multiplier/clock-division circuits 63, 64 generate and output a multiplier clock signal (i.e., a system clock signal) having a frequency in an order of MHz, according to a value set in a register (not illustrated) for setting a multiplier/clock-division ratio. Then, the multiplier clock signal output from the multiplier/clock-division circuit 63 is provided to a CPU clock that transmits the signal to the CPU 2, the interruption control circuit 3, the peripheral circuit 5 and the like, and for the memory 4, as required. The multiplier clock signal output from the multiplier/clock-division circuit 64 is provided to the debug circuit 6.

Further, the multiplier/clock-division circuit 63 stops the oscillation operation when the signal for setting the microcomputer 61 to the low electricity consumption mode (i.e., a low electricity consumption mode signal) becomes active. The low electricity consumption mode signal is output from the CPU 2, for example, at a predetermined transition cycle that is determined in advance, and becomes inactive when the timer for measuring a transition period to the low electricity consumption mode measures such transition period. Further, the low electricity consumption mode signal is provided to one of the input terminals of an AND gate 65. In addition, the signal that enables the function of the debug circuit 6 (i.e., a debug function enabling signal) is provided to the multiplier/clock-division circuit 64 through a NOT gate 66 as a stop control signal, and is also provided to the other one of the input terminals of the AND gate 65. The output signal of the AND gate 65 is provided to the oscillation circuit 62 as a stop control signal.

In the above configuration, the conditions for stopping the operation of each of the oscillation circuit 62, and multiplier/clock-division circuits 63, 64 based on the state of each of the low electricity consumption mode signal and the debug function enabling signal are summarized in the following.

| | Low Electricity Consumption Mode Signal | Debug Function Enabling Signal |
|---|---|---|
| Oscillation circuit 62 | O | X |
| Multiplier/clock-division circuit 63 | O | — |
| Multiplier/clock-division circuit 64 | — | X |

In the above table, "O" indicates "active," and "X" indicates "inactive."

Therefore, even when the microcomputer 61 transits to the low electricity consumption mode, the oscillation circuit 62 outputs the standard clock signal during an operation period of the debug circuit 6 due to the active state of the debug function enabling signal. However, due to the stopping of the multiplier/clock-division circuit 63, the CPU clock will not be output. On the other hand, because the multiplier/clock-division circuit 64 operates during the period of the active state of the debug function enabling signal, the multiplier clock signal is provided to the debug circuit 6. Then, the operation of the multiplier/clock-division circuit 64 stops when the debug function enabling signal becomes inactive.

In the above-described configuration of the fifth embodiment, in case that the microcomputer 61 is configured to be capable of transiting to the low electricity consumption mode according to the stop of the supply of the multiplier clock signal for the CPU 2 and the like, the multiplier clock signal is provided to the on-chip debug circuit 6 during a transition period to the low electricity consumption mode when the function of the debug circuit 6 is in an enabled state. Therefore, even in the transition period to the low electricity consumption mode, the debug circuit 6 is capable of measuring the above-described time period. Further, both of the two kinds of measurement separately enabled by one configuration in the second embodiment and the other configuration in the third embodiment are enabled by only one configuration in the fifth embodiment, thereby achieving a multi-purpose use of such configuration as well as preventing the increase of the circuit scale.

Although the present disclosure has been fully described in connection with preferred embodiment thereof with reference to the accompanying drawings, it is to be noted that various changes and modifications will become apparent to those skilled in the art.

For example, the configuration in FIG. 2 may be modified to select a signal that is required for the measurement according to each of individual system designs. That is, the configuration may be changed from the one in FIG. 2.

The comparator 22 may be configured to output a signal that is active when B is smaller than A (i.e., B<A). In such case, selection of "1" or "0" in the selector 26 may be reversed.

The configurations of the second, third and fourth embodiments may be used for other measurements, such as the measurement of the interrupt process time, the measurement of the interrupt hold time, the measurement of the interrupt prohibition time or the like, for example.

In the fourth embodiment, the adder 57 and the accumulation value storage register 58 may be implemented by using an accumulator.

The fifth embodiment may be combined with other embodiments.

Such changes, modifications, and summarized schemes are to be understood as being within the scope of the present disclosure as defined by appended claims.

What is claimed is:

1. A microcomputer having an on-chip debug circuit for debugging a program, the on-chip debug circuit of the microcomputer comprising: an event output unit for outputting a user-specified event in a program execution time of a CPU; a timer for measuring a time period between two user-specified events; and a measurement permission signal output unit for outputting a measurement permission signal that permits a measurement operation of the timer according to a user specified condition, wherein the timer is configured to perform the measurement operation between the two user-specified events and to temporarily stop the measurement operation during a non-active period of the measurement permission signal, and the timer is configured to resume the measurement operation after the non-active period ends, but before the user-specified event is output.

2. The microcomputer of claim 1 further comprising:
an interrupt process signal output unit for outputting an interrupt process signal indicative of execution of an interrupt process by the CPU, wherein
the measurement permission signal output unit specifies the interrupt process signal as the measurement permission signal.

3. The microcomputer of claim 1, wherein the measurement permission signal output unit further comprising:
an interrupt level setting register for setting an interrupt level that either permits or prohibits the measurement operation of the timer; and
a determination unit for determining by comparison a high-low relationship between an interrupt level of an interrupt process being executed by the CPU and the interrupt level set by the interrupt level setting unit in order to output a determination signal, and
the determination signal of the determination unit indicative of a determination result by the determination unit is specified as the measurement permission signal.

4. The microcomputer of claim 1 further comprising:
an interrupt hold signal output unit for outputting an interrupt hold signal that is indicative of holding of a low level interrupt process by the CPU which is generated during processing of a high level interrupt process, wherein
the measurement permission signal output unit specifies the interrupt permission signal as the measurement permission signal.

5. The microcomputer of claim 1 further comprising:
an interrupt prohibition signal output unit for outputting an interrupt prohibition signal that becomes active for a period during which an interrupt for the CPU is prohibited, wherein
the measurement permission signal output unit specifies the interrupt prohibition signal as the measurement permission signal.

6. The microcomputer of claim 1 further comprising:
a start address setting register for storing a measurement start address;
an end address setting register for storing a measurement end address; and
a comparison unit for comparing the start address setting register and the end address setting register respectively with a value of a program counter in the CPU, wherein
the on-chip debug circuit specifies a comparison result of the comparison unit as the event.

7. The microcomputer of claim 1 further comprising:
an interrupt process signal output unit for outputting an interrupt process signal indicative of execution of an interrupt process by the CPU; and
an edge detection unit for detecting a level change of the interrupt process signal as an edge, wherein
the on-chip debug circuit specifies the edge as the event.

8. The microcomputer of claim 1, wherein the measurement permission signal output unit further comprising:
an interrupt level setting register for setting an interrupt level of one of permitting and prohibiting the measurement operation of the timer;
a determination unit for determining whether an interrupt level of an interrupt process executed by the CPU is one of (a) being equal to or greater than an interrupt level set in the interrupt level setting unit and (b) being smaller than an interrupt level set in the interrupt level setting unit, to output a determination signal; and
an edge detection unit for detecting a level change of the determination signal as an edge, wherein
the on-chip debug circuit specifies the edge as the event.

9. The microcomputer of claim 1 further comprising:
an interrupt hold signal output unit for outputting an interrupt hold signal that is indicative of holding of a low level interrupt process generated during processing of a high level interrupt process; and an edge detection unit for detecting a level change of the interrupt hold signal as an edge, wherein
the on-chip debug circuit specifies the edge as the event.

10. The microcomputer of claim 1 further comprising:
an interrupt prohibition signal output unit for outputting an interrupt prohibition signal that becomes active for a period during which an interrupt for the CPU is prohibited; and
an edge detection unit for detecting a level change of the interrupt prohibition signal as an edge, wherein
the on-chip debug circuit specifies the edge as the event.

11. The microcomputer of claim 1 further comprising:
a maximum value storage register that stores a maximum value of measurement result by the timer, after an end of the measurement operation of the timer; and
a maximum value update unit that updates the maximum value storage register based on a comparison between (a) a measurement result by the timer in a latest measurement operation and (b) a maximum value stored in the maximum value storage register, after an end of the measurement operation of the timer, wherein
the measurement result is written in the maximum value storage register for updating the maximum value storage register when the measurement result is greater than the maximum value.

12. The microcomputer of claim 1 further comprising:
a minimum value storage register that stores a minimum value of measurement result by the timer; and
a minimum value update unit that updates the minimum value storage register based on a comparison between (a) a measurement result by the timer in a latest measurement operation and (b) a minimum value stored in the minimum value storage register, after an end of the measurement operation of the timer, wherein
the measurement result is written in the minimum value storage register for updating the minimum value storage register when the measurement result is smaller than the minimum value.

13. The microcomputer of claim 1 further comprising:
a measurement number counter that counts a number of measurement operations of the timer; and
an accumulation value register that stores accumulation of the measurement results each time the timer finishes the measurement operation.

14. The microcomputer of claim 1 further comprising:
a clock signal output circuit that generates and outputs a system clock signal, wherein
the microcomputer is capable of transiting to a low electricity consumption mode when a supply of the system clock signal for the CPU is stopped, and
during a transition period to the low electricity consumption mode, the system clock signal is supplied for the on-chip debug circuit if the on-chip debug circuit is in a functioning condition.

15. The microcomputer of claim 1, wherein
the timer is configured to resume the measurement operation after the non-active period ends, but before an end event occurs.

16. A microcomputer having an on-chip debug circuit for debugging a program, the on-chip debug circuit of the microcomputer comprising:
an event output unit configured to output, in a program execution time of a CPU, a user-specified start signal based on a user-specified start condition, and a user-specified end signal based on a user-specified end condition;
a timer configured to perform a measurement operation that measures an active time period between the output of the user-specified start signal and the output of the user-specified end signal; and
a measurement permission signal output unit configured to output one of a measurement permission signal and a measurement suspension signal to the timer based on an active/non-active condition, wherein
the measurement permission signal permits the measurement operation of the timer during the active time period,
the measurement suspension signal instructs the timer to temporarily suspend the measurement operation during a non-active time period,
the timer is configured to resume the measurement operation after the non-active period ends, but before the user-specified end signal is received.

* * * * *